United States Patent [19]
Sweeney

[11] Patent Number: 5,160,299
[45] Date of Patent: Nov. 3, 1992

[54] UNIVERSAL JOINT HAVING THREE CONCENTRIC SPHERICAL ELEMENTS INTERCONNECTED FOR RELATIVE MOTION BY A PLURALITY OF BALLS CARRIED IN COOPERATIVE INDENTATIONS DEFINED IN ADJACENT MOVABLE SURFACES

[76] Inventor: Albert Sweeney, 2720 Dillon Rd., Whitefish, Mont. 59937

[21] Appl. No.: 684,821

[22] Filed: Apr. 15, 1991

[51] Int. Cl.⁵ ............................ F16D 3/16; F16D 3/44
[52] U.S. Cl. ..................................... 464/141; 464/906
[58] Field of Search ............... 464/141, 906, 147, 151, 464/152, 139, 106, 145, 16, 15, 7, 137; 403/57, 74, 114

[56] References Cited

U.S. PATENT DOCUMENTS

| | | | |
|---|---|---|---|
| 270,287 | 1/1883 | Deschamps | 464/141 |
| 1,847,677 | 3/1932 | Sternbergh | 464/15 X |
| 1,947,046 | 2/1934 | Hoffman | 464/145 |
| 2,128,088 | 8/1938 | Hanft | 464/906 X |
| 3,310,960 | 3/1967 | Cull | 464/906 X |

FOREIGN PATENT DOCUMENTS

| | | | |
|---|---|---|---|
| 804801 | 11/1936 | France | 464/15 |
| 456205 | 6/1966 | Japan | 403/57 |
| 270795 | 5/1927 | United Kingdom | 464/141 |

Primary Examiner—Daniel P. Stodola
Assistant Examiner—Tony A. Gayoso
Attorney, Agent, or Firm—Keith S. Bergman

[57] ABSTRACT

A ball-type universal joint provides three concentric, relatively movable spherical elements that resists both compressive and extensive forces. An outer shell carries a first shaft and defines a medial chamber comprising more than half a hemisphere with a releasably fastenable outer portion to allow access. A medial shell carried in the outer shell chamber defines a spherical chamber comprising more than half a hemisphere with a releasably fastenable outer portion to allow access. An inner spherical ball carries a second shaft and is carried within the chamber defined in the medial shell. A plurality of ball bearings carried in indentations in the outer surface of the medial shell communicate with elongate slots defined in the interior surface of the outer shell to allow angulated motion of the outer and medial shells but prevent rotary motion. A plurality of ball bearings carried in indentations defined in the inner ball communicate with slots defined in the inner surface of the medial shell to allow angulated motion of the inner ball and medial shell but prevent rotary motion. A protective boot encloses the joint between the first and second shafts and lubrication passages are provided for the relatively moving surfaces.

2 Claims, 3 Drawing Sheets

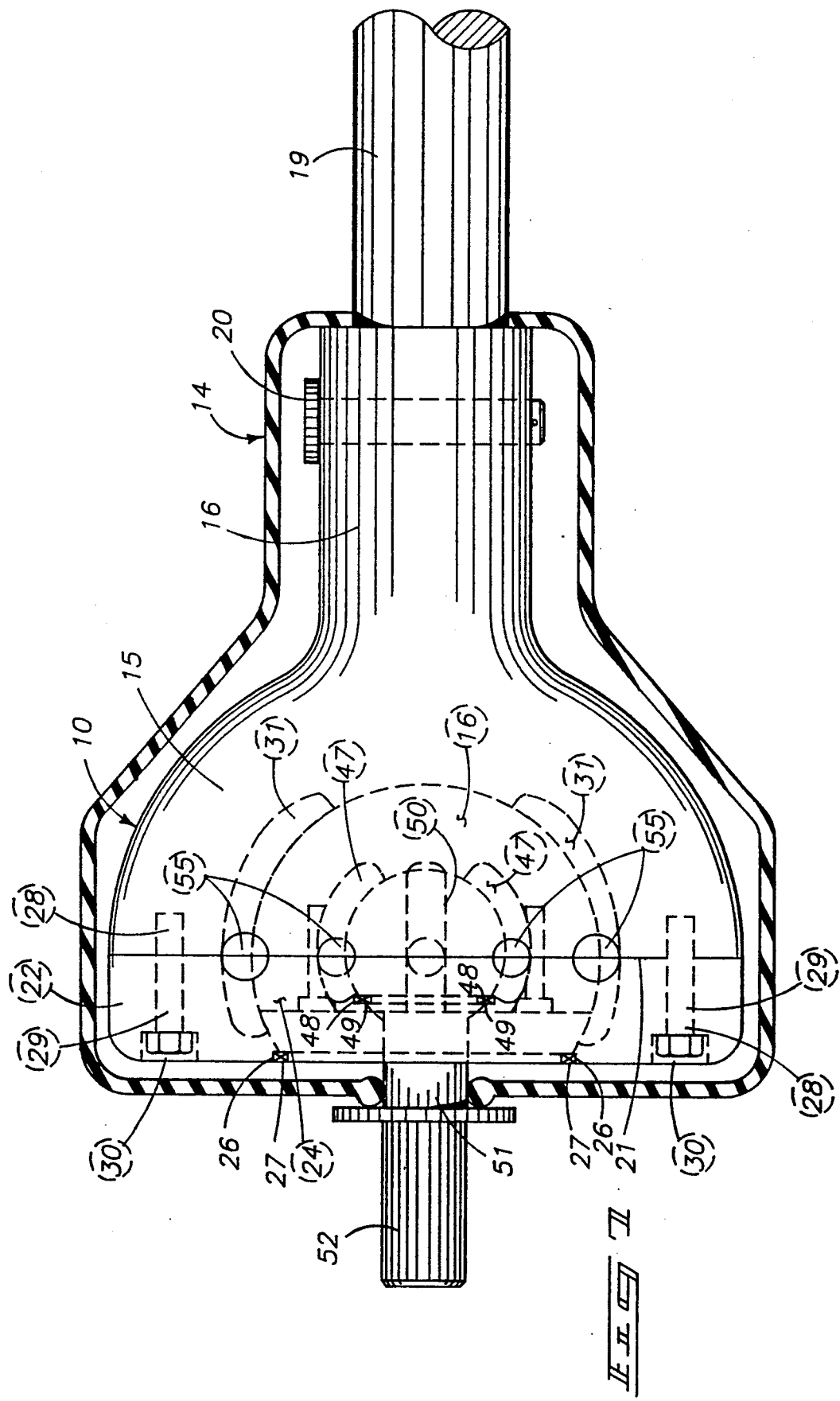

UNIVERSAL JOINT HAVING THREE CONCENTRIC SPHERICAL ELEMENTS INTERCONNECTED FOR RELATIVE MOTION BY A PLURALITY OF BALLS CARRIED IN COOPERATIVE INDENTATIONS DEFINED IN ADJACENT MOVABLE SURFACES

BACKGROUND OF INVENTION

1. Related Applications

There are no applications related hereto heretofore filed in this or any foreign country.

2. Field of Invention

My invention relates generally to universal joints, and more particularly to a ball type universal joint having three concentric spherical elements irrotatably interconnected by plural ball bearings extending between each adjacent pair of spherical elements.

3. Background and Description of Prior Art

Universal joints are widely used to interconnect two rotary shafts that are or may be angulated relative to each other. The sophistication of the mechanics of universal joints has grown substantially since the time of the original Hooke's or Cardan joint which provided two shafts carrying yokes each journaled on opposed ends of perpendicular arms of an interconnecting spider. This type of joint provided a variable angular velocity and by reason of this, often did not meet the sophisticated needs of many modern machines. The so-called Bendix-Weiss joint remedied this angular velocity problem by providing joints that would maintain constant angular velocity, and various improved version of this type of joint, especially that credited to Ruinitti, added sophistications to improve mechanical features that allowed effective use in joints that continuously change the angular relationship between two interconnected shafts. My invention provides a new and improved member of this latter class of device that is particularly adapted for constant use for transmitting substantial torque loads in heavy machine applications, especially where the joint is subjected to extensive forces.

My joint provides three concentric elements with adjacent spherical surfaces, all of which define more than a hemisphere. This structure is accomplished by the compound nature of the outer two elements that provide releasably interconnected parts joined in the plane of the great circle parallel to their openings to allow assemblage. Such a construction allows surface contact area between adjacent elements that is substantially greater than in spherical type joints heretofore known. The surface contact area, when considered in connection with its configuration, provides substantial strength for my joint which allows the medial shell to be formed from plastic materials that are used in the machine arts to obtain the benefits of such materials in lubricating, absorbing shock and performing other functions for which they are known.

The particular three element spherical construction of my joint is resistive to, and well adapted for operation with, either compressive or extensive forces between the shafts which are joined. Early universal joints and many of later origin are not particularly adapted to resist compressive forces. Many later Bendix-Weiss type joints were not particularly resistive to extensive forces and some had to be maintained in assembled mode by additional mechanical means such as external housing structures journaled on the input and output shafts. The particular spherical geometry of my joint and the physical characteristics of the materials involved, also allow quite substantial angulation of two interconnected shafts, up to about one hundred twenty degrees of included angle, without unduly stressing or straining the various components.

The three element construction of my joint allows interconnection of adjacent relatively movable spherical surfaces by ball bearings that are radially spaced from each other for each pair of surfaces. This construction provides more strength in the medial spherical shell than is provided by three element joint structures that merely provide a medial keeper ring, or that provide all interconnecting elements on, or substantially on, a common sphere. Though the instant invention is readily distinguishable from two part spherical joints, those joints also have similar infirmities in that all interconnectors, which commonly are of a ball type, are carried on a common spherical surface and within a relatively small circular band, as opposed to the instant connectors which are carried in two such bands that are spaced radially relative to each other.

The spherical construction of my joint allows simple lubrication by ducts communicating exteriorly of the joint which may be serviced by either pressurized or unpressurized lubricants.

My invention lies not in any one of these features per se, but rather in the synergistic combination of all of the structures of my joint that produce the functions necessarily flowing therefrom, as herein specified and claimed.

SUMMARY OF INVENTION

My invention provides a compound outer shell defining an internal spherical chamber having a circular orifice and comprising more than a hemisphere, with a releasably interconnected annular element defining the portion of the shell greater than a hemisphere to allow assemblage, and a first shaft extending therefrom perpendicularly to the plane of the circular orifice. A medial spherical connector shell, defining an internal chamber having a circular orifice and comprising more than a hemisphere is carried in the outer shell chamber and is of compound nature with a releasably fastenable annular element defining the shell portion greater than a hemisphere. An inner spherical ball, carrying a radially extending second shaft is carried within the chamber of the medial shell with its second shaft extending through the orifice defined in the shell. A plurality of ball bearings are carried in hemispherical holes defined in the surface of the inner ball, with their centers on the great circle of that ball perpendicular to its interconnected axle, and extend into complementary elongate slots defined in the inner surface of the medial shell to allow limited angulated motion of the inner ball relative to the medial shell. A plurality of ball bearings are carried in hemispherical indentations defined in the outer surface of the medial shell, with their centers in a great circle in a plane parallel to the shell orifice, and extend into complementary slots defined in the inner surface of the outer shell to allow limited angulated motion of the medial shell relative to the outer shell. Ducts extending from the external surface of the joint to and between its inner surfaces that move relative to each other provide lubrication.

In creating such a universal joint, it is:

A principal object to create a joint structure having three concentric spherical elements all defining more than a hemisphere to resist either compressive or especially extensive forces exerted between the opposed shafts of the mechanism.

A further object is to create such a joint that provides substantial areas of surface contact between each of its articulating elements in any position which those elements may assume to provide substantial strength.

A further object is to create such a joint that provides ball type interconnection between the relatively movable spherical elements, with the balls between each pair of interconnected elements being radially spaced from each other rather than in or substantially in the same common spherical surface.

A still further object is to provide such a joint that is of new and novel design, of rugged and durable nature, of simple and economic manufacture, and otherwise well suited to the uses and purposes for which it is intended.

Other and further objects of my invention will appear from the following specification and accompanying drawings which form a part hereof. In carrying out the objects of my invention, however, it is to be understood that its features are susceptible of change in design and structural arrangement with only one preferred and practical embodiment being illustrated in the accompanying drawings, as is required.

BRIEF DESCRIPTION OF DRAWINGS

In the accompanying drawings which form a part hereof and wherein like numbers of reference refer to similar parts throughout:

FIG. 3 is an orthographic side view of the medial shell with various internal structures shown in dotted outline.

FIG. 4 is an orthographic end view of the medial shell, with the inner ball in place therein, taken from the left end of FIG. 3, on the line 4—4 thereon in the direction indicated by the arrows, with some internal structure shown in dashed outline.

FIG. 7 shows an orthographic side view of my joint operatively assembled within the encasing protective boot partially cut-away and with various internal structure shown in dotted outline.

DESCRIPTION OF THE PREFERRED EMBODIMENT

My invention generally provides outer shell 10 movably carrying medial shell 11 which in turn movably carries inner ball 12 with interconnecting means 13 communicating between each relatively movably pair of elements to interconnect them in an angularly movable but irrotatable relationship. Boot 14 protectively covers the joint structure.

Figure 1:
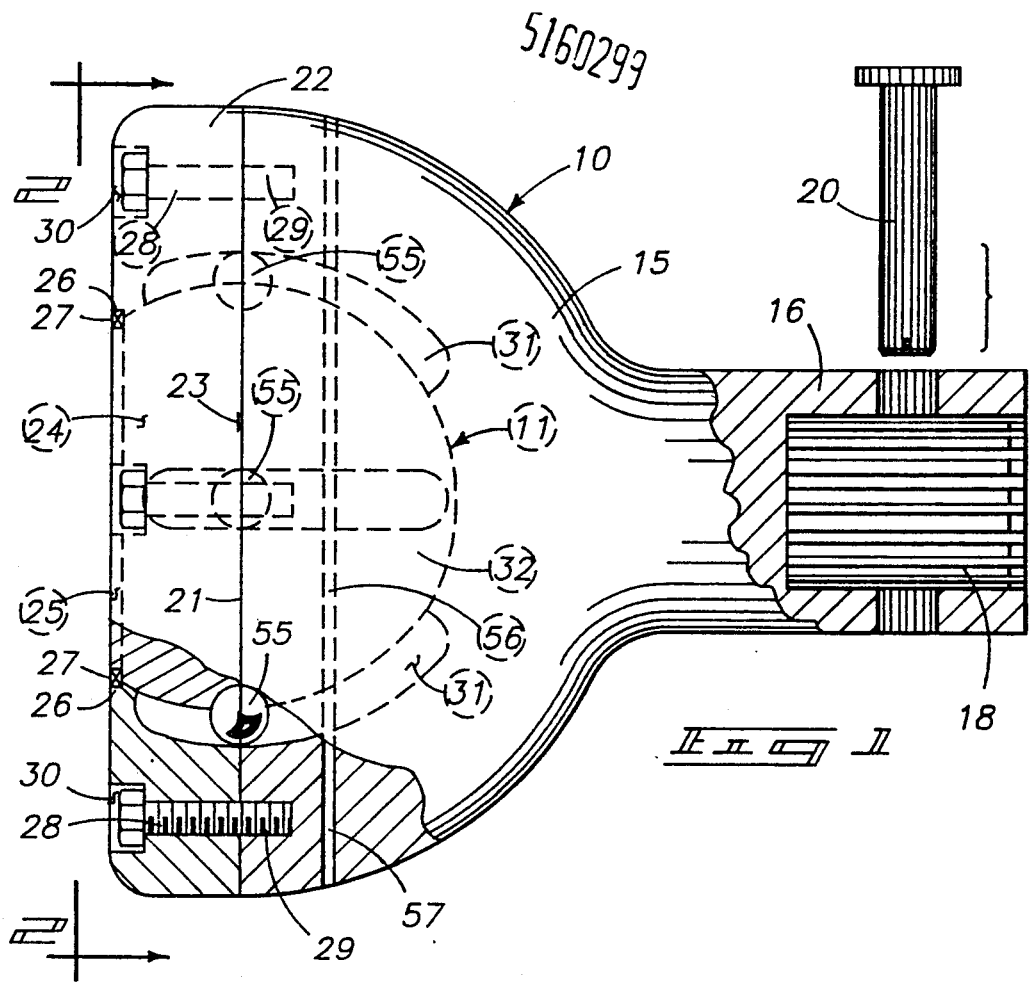
FIG. 1 is a partially cut-away orthographic side view of the outer shell of my joint, with some internal structures shown in dashed outline.
Figure 2:
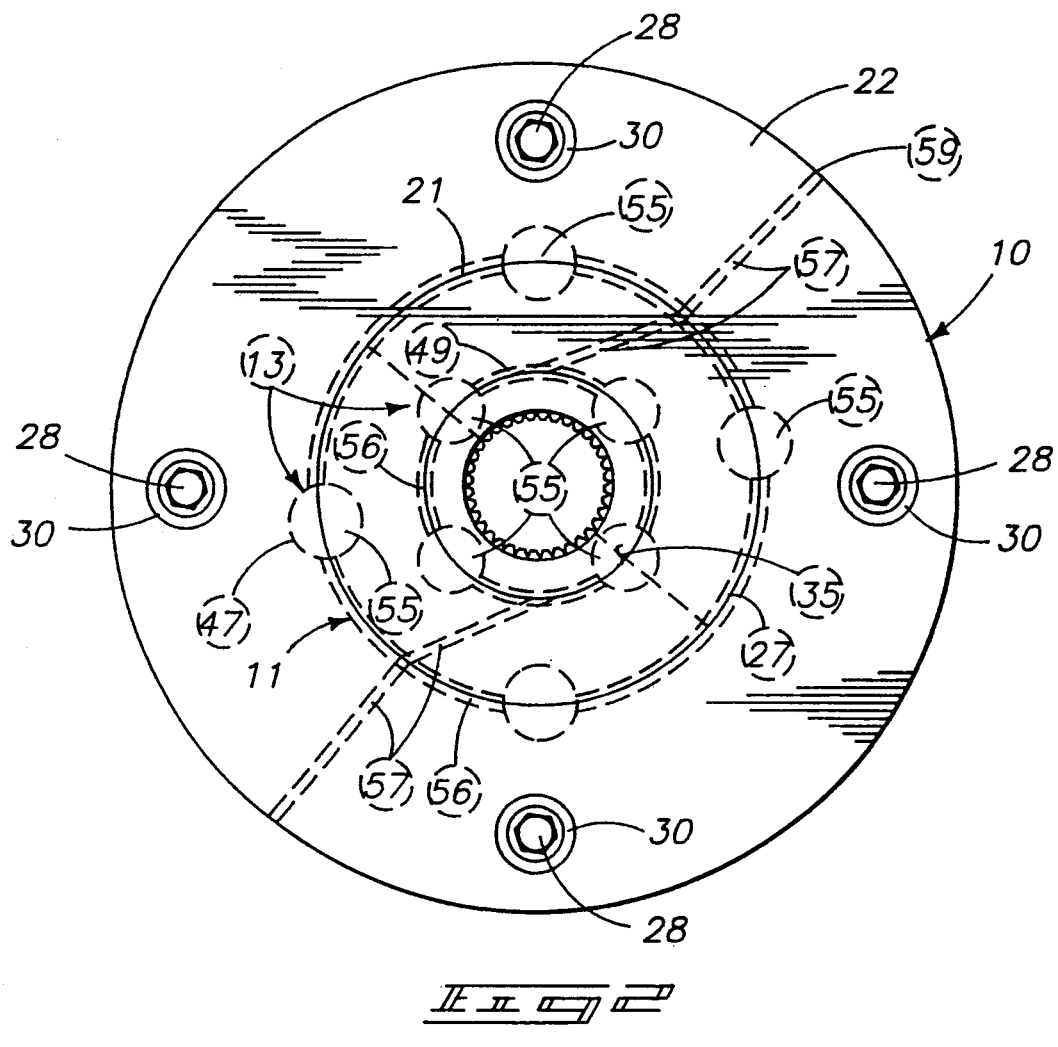
FIG. 2 is an orthographic end view, taken from the left end of FIG. 1, as on the line 2—2 thereon in the direction indicated by the arrows, with some internal structure shown in dashed outline.

For convenience of reference only, and not by means of mechanical limitation, the joint end to the right in FIG. 1 will be referred to as the input end and the end to the left in that Figure as the output end.

Outer shell 10 provides body 15 defining hemispherical chamber 16 and structurally carrying first input shaft 17. The first shaft defines splined cylindrical channel 18 to receive and irrotably carry the end portion of first input shaft 19, which is maintained in the channel 18 by fastening pin 20 releasably communicating in frictional engagement through both structures. The shaft structure is so configured that the axis of first input shaft 19 is perpendicular to plane 21 through the great circle defining the periphery of hemispherical chamber 16. The radial thickness of body 15 and its external configuration are such as to allow definition of its other structural features and provide appropriate strength and rigidity for the element.

Outer shell body extension 22 is an annular element having an external diameter coextensive with body 15 and a planar surface 23 to fit immediately adjacent the output end of the outer shell body. The body extension defines medial chamber 24 which is configured as an extension of the same sphere defining the surface of hemispherical chamber 16. The thickness of the body extension is dictated by the structural specified parameters of the body, except for the size of output shaft orifice 25 which is such as to allow the desired angulated positioning between output and input shafts and yet provide appropriate strength for the extension. Output shaft orifice 25 defines annular gasket groove 26 that receives flat annular gasket 27 to provide a lubricant seal between the output end of adjacent surfaces of the outer shell and the medial shell. Body extension 22 is releasably fastened to body 15 by plural bolts 28 passing through circumferentially spaced holes 29 defined through the body extension and extending into threaded engagement in the adjacent portion of outer shell body 15. Preferably these holes 29 define countersunk portions 30 in their outer portions to receive bolt heads within the outer shell structure.

The inner surfaces of the chambers 16 and 24 defined by the outer shell body and body extension respectively communally define elongate ball grooves 31 that are equally spaced about circle 21 and extend in the surface of both body 15 and body extension 22 through a central spherical angle sufficient to allow joint angulation relative to an output shaft within desired limits. This central spherical angle is generally about sixty degrees, though it may extend through angles up to approximately seventy-five degrees, depending upon specific dimensions and material parameter. The depth and cross-sectional configuration of grooves 31 is appropriate to contain substantially half of the diameter of a ball to be carried therein, and the axes of the several grooves all lie on great circles of the spherical surface defining the chambers 16 and 24 that are perpendicular to circle 21, and lie in planes perpendicular to each adjacent groove in the instance illustrated.

Medial shell 11 provides body 32 having hemispherical outer surface 33 and concentric inner surface 34 defining hermispherical chamber 35. The medial shell has a planar output end 36 comprising the great circle 37 defining the periphery of chamber 35. Annular medial shell body extension 38 has planar input facing end surface 39 to fit adjacent surface 36 of medial shell body 32. This body extension is so configured that its external surface forms a continuous sphere with the external surface of the shell body, and the body defines internal chamber 40 having a spherical configuration that is continuous with the hemispherical chamber 35 of the shell body. The body extension 38 is releasably interconnected to body 32 by plural bolts 41 threadedly engaged in spaced holes 42 extending through the body extension and into threaded engagement in the adjacent portion of the shell body 32. Preferably these holes 42 provide outer countersunk portions 42 to receive bolt heads and the holes are appropriately spaced to avoid interference with any other medial shell structures.

Outer surface 33 of the medial shell body and outer surface 44 of the body extension cooperate at their juncture to define four equidistant circumferentially spaced ball bearing holes 47, each carrying substantially half of a ball bearing that extends radially outwardly from the medial shell to communicate with ball grooves 31 defined in the inner surface of outer shell 10 to carry interconnecting ball bearings therebetween the centers of the ball bearings carried in holes 47 lie in the plane defining the interconnecting surfaces of medial body 32 and body extension 38.

The adjacent inner spherical surfaces 34 and 45 of the medial shell cooperatively define four connecting grooves 48 circumferentially spaced in equidistant array about the periphery of the inner surfaces. The grooves extend with their axes in great circles perpendicular to circle 37 and are of half circular cross-section to receive the projecting portions of ball bearings carried in the outer surface of inner ball 12. The angular length of these grooves is not critical, but for practical purposes is limited to approximately seventy-five degrees of central spherical angle by reason of the configuration and material strength of the various elements involved.

The surface defining the output end orifice in body extension 38 defines annular gasket groove 48 to receive and positionally maintain annular oil gasket 49 which aids in maintaining lubricant between the inner surface of the spherical chamber defined in the medial shell and the outer surface of inner ball 12.

Inner ball 12 provides spherical body 50 interconnecting second output shaft 51 having splined end 52 to aid irrotatable interconnection with another shaft. Output shaft 51 carries motion limiting disk 53 spacedly outwardly from ball body 50 to serve as a seal for the output end of covering boot 14 and prevent excessive angulation of the second output shaft relative to the joint outer shell. The size of ball body 50 is such as to fit immediately inwardly adjacent the spherical chamber 35, 39 defined in the medial shell 11.

Figures 5, 6:
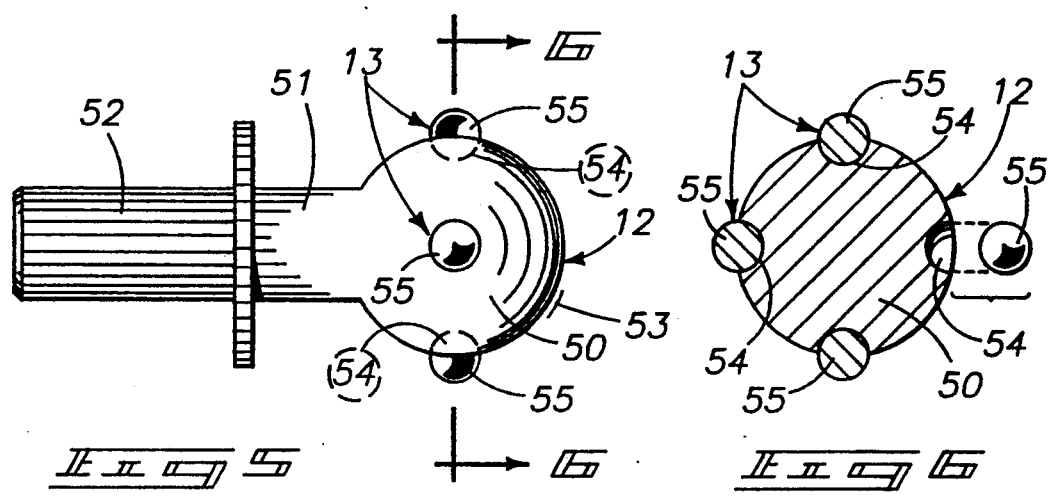
FIG. 5 is an orthographic side view of the inner ball and interconnected axle.
FIG. 6 is a medial cross-sectional view through the inner ball of FIG. 5, taken on the line 6—6 thereon in the direction indicated by the arrows.

External surface 53 of ball body 50 defines four ball bearing holes 54, each of hemispherical shape and spaced in equidistant array about the circumference of the great circle of the ball body that is perpendicular to the axis of output shaft 51. These ball bearings project outwardly from the surface of ball body 50, as shown particularly in FIG. 6, to extend into ball grooves 47 defined in the inner surface of medial shell 11.

Interconnecting means 13 provide ball bearings 55 carried in holes 54 defined in the inner ball and in holes 46 defined in the outer surface of medial connector 11. These ball bearings may be of the same size and preferably are so configured for ease of manufacture, though equal sizing is not necessary for the operation of my joint. In fact, all ball bearings may be of different size so long as the hole carrying a ball and the adjacent cooperating groove in which the ball is to move are of the same diametrical size. If the bearings 55 are not large enough, however, there may be a relatively small total area resisting rotary shear between the two sets of relatively movable surfaces to prevent rotation relative to each other.

Circular lubrication grooves 56 are defined between the ball bearing holes 46 defined in the outer surface 33 of medial connector 11 and between the ball bearing holes 54 defined in the surface of inner ball 12. Lubrication is provided to these circular grooves 56 through straight duct 57 communicating from the outer peripheral surface of outer yoke 10. Lubricant introduced in grooves 56 tends to move inwardly to the outermost groove 56 and between the grooves to lubricate all relatively moving surfaces. Straight output orifice 59 communicates from the inner circular groove 56 to the external surface of outer shell 10 to establish a lubricant flow course through the joint. The lubricant may be pressurized in this course if desired or necessary. The ducts 56 may be serviced by traditional grease fittings (not shown) carried on the exterior surface of outer yoke 10 if desired.

The entire assembled joint structure is covered by boot 14, preferably formed of resiliently deformable material such as rubber or an elastomeric polymer. The shape of the boot is somewhat similar to the external peripheral configuration of outer shell 10 and defines input shaft hole 58 and output shaft hole 59 to allow passage of shafts therethrough. The structure and configuration of this boot is convenient but not essential to my joint and the general nature of such protective boots is known in the mechanical arts and well within the skill of an ordinary designer.

Having thusly defined the structure of my joint, its operation may be understood.

The various elements of my joint structure are formed according to the foregoing specification with such size as is appropriate for the use to which the joint is to be put. To assemble the joint, body extension 38 of the medial shell is placed over output shaft 51, with its planar surface facing the ball. Ball bearings 55 are positioned in holes 54 defined in the inner ball body 50 and the body 32 of the inner shell is then positioned over the inner ball with its associated ball bearings 55 extending into grooves 47. The body 32 and body extension 38 of the medial shell are then fastened together by threadedly engaging bolts 41 in bolt holes 42 to encase the inner ball in the medial shell chamber.

Additional balls 55 are then established in ball holes 46 defined in the outer surface of medial shell 11. The outer shell is then positioned over the inner shell with balls 55 extending into grooves 30. The outer shell extension 22 is moved from the output end of the device over the output shaft, with its inner planar surface extending toward the input end, and brought into communication with the outer shell body. The extension is then fastened to the outer shell body by threadedly engaging bolts 28 through holes 29 to encase the medial shell. The joint is then assembled and may be fastened in a mechanical drive train by means of its input and output shafts.

In assembled condition, it is to be noted that the input and output shafts of my joint may be aligned, with axes coincident with each other, and in this or any angulated position are prevented from linear motion along their axes by reason of the spherical structure of each of the three concentric interconnected elements of my joint comprising more than a hemisphere. It is further to be noted that the input and output shafts will be prevented from any rotary motion relative to each other by reason of the ball bearings extending between each set of relatively movable concentric spherical surfaces of the joint.

When assembled the joint will allow angulation of the input shaft relative to the output shaft during rotary motion of the joint. The inner ball may move angularly relative to the medial shell in either of two perpendicular planes by reason of the interconnection of these elements by balls carried in the perpendicular pairs of circular grooves that are diametrically opposed. The medial shell may similarly move relative to the outer shell by reason of the same interconnecting structures defined between those elements. The joint then allows the input and output shafts to rotate in unison and in an angulated fashion, as the articulating linkage will allow three-dimensional constantly changing angulation between those shafts, limited only by the size of the orifices in the shell elements and the size of the output shaft. The sizes of these elements may be regulated within limits, but generally in ordinary constructions the joint will allow an included angle between interconnected shafts of up to approximately one hundred twenty degrees.

Lubricant may be established through input channel 58 of the lubrication system and by reason of the interconnection of the various channel components of that system the lubricant may pass through the joint and exit from output channel 59 to create a flow circuit. The lubrication channels communicate with portions of all relatively moving surfaces so that lubricant may be distributed to such surfaces by reason of their relative motion during operation. A pressurized lubrication system can be used, but has not been found to be particularly necessary in my joint.

The external boot covering my joint is not necessary to joint operation, but is merely a convenience to protect the joint, keep debris out of it, and contain any excess lubricant.

The foregoing description of my invention is necessarily of a detailed nature so that a specific embodiment of it might be set forth as required, but it is to be understood the various modifications of detail, rearrangement and multiplication of parts might be resorted to without departing from its spirit, essence or scope.

Having thusly described my invention, what I desire to protect by Letters Patent, and what I claim is:

1. A universal joint having three angularly movable, irrotably interconnected, concentric spherical elements that resist both compressive and extensive forces, comprising in combination:

an outer shell carrying a first shaft and defining a spherical medial chamber comprising more than a hemisphere, said outer shell having
  a body defining a hemisphere of the spherical chamber with the great circle of the orifice of said hemisphere being perpendicular to the first shaft,
  an annular releasably fastenable body extension fitting on the orifice of the body and having an outer surface continuous with the outer surface of the outer shell and defining a partial spherical chamber having a surface continuous with the inner hemispherical chamber defined in the outer shell body, said body extension defining an orifice parallel to the great circle of the outer shell body, and
  a plurality of circumferentially spaced bolts extending through holes defined in the outer shell extension and into threaded engagement in cooperating holes defined in the outer shell body to releasably fasten the outer shell extension to the outer shell body;

a medial shell defining an outer spherical surface comprising more than a hemisphere of size to fit within the chamber defined in the outer shell, said medial shell having
  a body defining a hemisphere of a spherical chamber with a great circle orifice,
  an annular medial body extension releasably carried by the body and defining an internal spherical chamber coextensive with the spherical chamber defining in the body with an orifice parallel to the great circle defining the body orifice, and
  a plurality of circumferentially spaced bolts extending through holes defined in the body extension and into threaded engagement with complementary holes defined in the body to releasably fasten the said extension to the medial shell body;

an inner spherical ball carrying a second radially extending shaft and defining a spherical surface fitting within the spherical chamber defined by the medial shell;

means for interconnecting the inner ball and medial shell and between the medial shell and outer body comprising
  a plurality of circumferentially spaced hemispherical indentations defined with centers on a circle parallel to the great circle of the inner ball that is perpendicular to the second axis and a plurality of circumferentially spaced hemispherical indentations defined in the outer surface of the medial shell with centers parallel to a great circle defined by the medial shell member parallel to the plane of the medial shell orifice,
  a plurality of circumferentially spaced elongate grooves defined in the inner surface of the outer shell spaced complementary to the hemispherical indentations defined in the medial shell, said grooves being of hemispherical cross-section and extending in great circles perpendicular to the great circle defining the outer shell body orifice;
  a plurality of circumferentially spaced elongate grooves defined in the inner surface of the medial shell spaced complementary to the hemispherical indentations defined in the inner ball, said grooves being of hemispherical cross-section and extending in great circles perpendicular to the great circle defining the inner shell body orifice, and
  a plurality of balls carried in each hemispherical indentations and extending into the adjacent complementary groove to prevent relative rotation of said interconnected members but allow angular motion of the said members relative to each other; and a lubricating system comprising:
  a first straight duct communicating through the outer shell to a first circular lubrication groove communicating between the spherical indentations defined in the outer surface of the medial shell, and a second straight duct communicating from the first circular lubrication groove to a second circular lubrication groove communicating between the spherical indentations defined in the inner ball, an output duct communicating from the second circular lubrication groove through the medial and outer shells to the exterior of the outer shell, and means between the inner ball and orifice of the inner shell, between the medial shell and the outer shell to maintain lubricant between the relatively movable adjacent surfaces of the said members.

2. A universal joint having three angularly movable, irrotatably interconnected, concentric spherical elements that resist both compressive and extensive forces, comprising in combination:

an outer shell carrying a first shaft and defining a spherical medial chamber comprising more than a hemisphere, said outer shell having a body defining a hemisphere of the spherical chamber with a great circle orifice of said hemisphere being perpendicular to the first shaft, an annular releasably fastenable body extension having a first planar end to fit on the orifice of the outer shell body and a second end defining an orifice, said body extension defining a zone of a spherical chamber having a surface continuous with the inner hemispherical chamber defined in the outer shell body, and means for releasably fastening the outer shell body extension to the outer shell body;

a medial spherical shell defining an outer spherical surface and a concentric spherical medial chamber comprising more than a hemisphere, said medial shell having a body defining a hemisphere of size to fit within the chamber defined in the outer shell, an annular body extension having a first planar end to fit upon the body, and a second end defining an orifice, said body extension defining internal and external hemispheric surfaces coextensive with the inner and outer surfaces of the body, and means for releasably fastening the body extension to the medial shell body;

an inner spherical ball carrying a second radially extending shaft and defining a spherical surface of size to fit within the spherical chamber defining by the medial shell; and a lubrication system comprising a first straight duct communicating through the outer shell to a first circular lubrication groove communicating between the sets of indentations defined between the outer shell and the medial shell, and a second straight duct communicating from the first circular lubrication groove to a second circular lubrication groove communicating between the sets of indentations defined between the inner shell and the inner ball, an output duct communicating from the second circular lubrication groove through the medial and outer shells to the exterior of the outer shell, and gasket means communicating between the inner ball and the outer shell and between the medial shell and the outer shell to maintain lubricant between the adjacent surfaces of said members.

* * * * *